United States Patent [19]

Matsubara et al.

[11] 3,932,144

[45] Jan. 13, 1976

[54] COATED METALLIC SHEET FOR USE IN MAKING A CONTAINER

[75] Inventors: Takashi Matsubara; Yuko Takeuchi, both of Nagoya; Tadashi Tanaka, Yokohama; Tatsuro Obi, Tokyo; Akio Watanabe, Kawasaki, all of Japan

[73] Assignees: Nippon Steel Corporation; Toagosei Chemical Industry Co., Ltd., both of Tokyo, Japan

[22] Filed: Dec. 4, 1974

[21] Appl. No.: 529,555

[30] Foreign Application Priority Data

Dec. 7, 1973 Japan.............................. 48-136083

[52] U.S. Cl.................................. 29/195; 260/831
[51] Int. Cl.$^2$......................................... B32B 15/08
[58] Field of Search..................... 29/195 P; 260/831

[56] References Cited
UNITED STATES PATENTS

| | | | |
|---|---|---|---|
| 3,245,577 | 4/1966 | Virzi | 29/195 X |
| 3,526,486 | 9/1970 | Smith et al. | 29/195 X |
| 3,826,628 | 7/1974 | Addinall et al. | 29/195 |
| 3,849,176 | 11/1974 | Asano et al. | 29/195 X |

*Primary Examiner*—L. Dewayne Rutledge
*Assistant Examiner*—E. L. Weise
*Attorney, Agent, or Firm*—Watson Leavenworth Kelton & Taggart

[57] ABSTRACT

A coated metallic sheet adapted for use in making a can for foodstuff or other container. This sheet can be made by coating, upon a material sheet, a composition of a resol-type thermosetting phenolformaldehyde resin and a bisphenol "A" type epoxy resin. In said phenol-formaldehyde resin, the ratio by weight of orthocresol to phenol is between 60:40 and 10:90. Said epoxy resin has a mean molecular weight of 800 or more and is used in an amount of 0.2 to 1.5 part by weight per 1 part by weight of said phenol-formaldehyde resin in said composition. This composition used for the sheet displays an excellent adhesiveness particularly with respective to the use of a polyamide type adhesive.

1 Claim, No Drawings

COATED METALLIC SHEET FOR USE IN MAKING A CONTAINER

DETAILED DESCRIPTION OF THE INVENTION

It has heretofore been a practice to use a tin-plate for many metallic containers such as a general can for foodstuffs including an 18 #1 can. The use of such tin-plate still preserves a high level as compared with the other materials for cans. However, instead of using this tin-plate, such new materials as a thin chrome-plated steel sheet (Japanese Pat. No.308065), a nickel-plated steel sheet having about $0.001\mu$ to $0.01\mu$ of metallic nickel, an aluminium-plated steel sheet having about $0.001\mu$ to $0.01\mu$ of vacuum-evaporated aluminium and an aluminium sheet having the anode-treated surface, etc. have sequentially been developed for practical use. In case of using these new materials, the joint part of the body of the can not be soldered as with the tin-plate. Accordingly, the body of the can must be made by means of welding or by means of jointing with an adhesive agent as with the case of TFS-CT (Tin-free steel-chromium type). Particularly when an adhesive agent of polyamide type is used, the adhesive strength of the joint part is required to have a high level in view of the circumstances under which it is practically used. Also there is a great problem of deterioration by aging incidental thereto.

Thus, even when a coating material for can which has conventionally been considered as having good adhesiveness with respect to the tin-plate or the TFS-CT sheet, etc. is applied to the cold-rolled steel sheet, the nickel-plated steel sheet, the aluminium-plated steel sheet, etc. and a can body is manufactured therefrom by means of the lap-seam process using the adhesive agent, the can body thus obtained is incomplete with respect to its function because the adhesive strength between the coated film and the surface of the metal at the joint part becomes degraded rapidly owing to the moisture or other corrosive elements existing in the interior surface of the can. For example, when the body of the No. 5 can (Size 301) is made by means of the lap seam process, filled with water and subjected to the sterilizing treatment by steam for 90 minutes, the adhesive strength at the joint part is so insufficient that the joint part will often be peeled off, which gives rise to leakage of the can body. Also during a relatively long storage, the exfoliation will occur from the joint part whereby the content of the can leaks out. Accordingly, there is a serious problem left regarding the commercialization of the can to be subjected to the sterilizing treatment by steam or the can of a large size requiring the strength of the can.

The very thin nickel-plated steel sheet is disclosed in Japanese Patent appln. No. 3274/69. The amount of nickel contained is in the order of $0.001\mu$ to $0.02\mu$. This is one of the unique material for the can which can be made by the simple process as disclosed in said application. The aluminium-plated steel sheet refers chiefly to the vacuum-evaporated aluminium-plated steel sheet. The amount of aluminium deposited thereby is in the order of $0.001\mu$ to $0.1\mu$. This is also a promising material for the can, taking the place of the tin-plate or the TFS-CT material in future. However, for these new materials as well as for the cold-rolled steel sheet, the paint or coating for the can having high adhesive strength have not been obtained so far and it is thus the desideratum to obtain a new paint or coating necessary for the primary coat, if the can body is to be jointed together by means of the jointing process.

After various studies about paints or coatings, the inventors have found that the metallic sheet of this invention can have a complete function enough to be used as the material under the above conditions.

It is therefore an object of the invention to provide a coated metallic sheet for the container or can which will overcome the disadvantages encountered in the prior art.

It is another object of the invention to provide a composition for use in the coated metallic sheet having excellent characteristics in adhesiveness particularly for the polyamide adhesive agent.

The material sheet for coating used in this invention is the cold-rolled steel sheet, the very thin nickel-plated steel sheet, the aluminium-plated steel sheet and the aluminium sheet.

The point of this invention is to obtain a coated metallic sheet adapted for use as a container or can which comprises a composition coated on a material sheet selected from the group consisting of the cold-rolled steel sheet, the very thin nickel-plated steel sheet, the aluminium-plated steel sheet and the aluminium sheet, said composition consisting of the resol-type thermosetting phenol-formaldehyde resin and the bisphenol A type epoxy resin at the ratio of one part by weight of said phenol-formaldehyde resin to 0.2 to 1.5 part by weight of said epoxy resin, said phenol-formaldehyde resin comprising orthocresol and phenol at the weight ratio of 60:40 to 10:90, and said epoxy resin having a mean molecular weight of 800 or more.

The resin to be coated upon the metallic sheet for the container or can of this invention is a composition consisting of the resol-type thermosetting phenol-formaldehyde resin and the bisphenol A type epoxy resin at the ratio of one part by weight of said phenol-formaldehyde resin to 0.2 to 1.5 part by weight of said epoxy resin, said phenol-formaldehyde resin comprising orthocresol and phenol at the weight ratio of 60:40 to 10:90, and said epoxy resin having a mean molecular weight of 800 or more.

This composition is further described in detail as follows.

The weight ratio of the orthocresol to the phenol in the thermal reaction type phenol resin should preferably be in the range between 60:40 and 10:90, and if so, the adhesive power to the polyamide type adhesive agent becomes very excellent. Also, in the mixing of the orthocresol and the phenol, a certain amount of other cresols, xylenols, naphthols, bisphenol A, or other monohydric or polyhydric phenols can be substituted. The thermosetting or heat-reaction type phenol resin of this kind can be obtained by subjecting an aqueous solution of phenol, orthocresol and formaldehyde to a heating reaction in the normal alkaline catalyst and thereafter dehydrating the same. On the other hand, as for the bisphenol A type epoxy resin having a mean molecular weight of at least 800, the commercial product under the trade name of EPIKOTE 1001, 1004, 1007 and 1009 made by Shell Oil Co., Ltd. and ARALDITE 6097 made by Ciba, Ltd., etc. are suitable.

In this invention, when the bisphenol A type epoxy resin having a mean molecular weight of less than 800, the alicyclic epoxy resin or the tetra epoxy resin, etc. are used, a desired strength can not be obtained. Also in this invention, when the bisphenol A type resin is used in an amount more than 1.5 part by weight per 1 part by weight of the thermosetting phenol resin, it is necessary to conduct the curing at a temperature above the 210°C at which the normal curing has been conducted. On the other hand, if the former resin is used in an amount less than 0.2 part by weight, a satisfactory adhesion strength can not be obtained.

In case that a composition having already the thermosetting phenol resin and the bisphenol A type epoxy resin is coated, it is possible to dissolve the same in such solvent as ketones, for example, acetone, methyl ethyl ketone, methyl isobutyl ketone, etc., benzene, toluene, xylene, ethyl acetate, n-butanol, butyl cellosolve, cellosolve acetate, butyl cellosolve acetate, diacetone alcohol, cyclohexanone, isophorone, methyl cellosolve, etc. or a mixture thereof. Then the solution may be coated on the material sheet, and thereafter the solvent is dried and removed, followed by curing, to finally obtain various coated metallic sheet of this invention.

As for the polyamide type adhesive agent, the Nylon 11, Nylon 12, Nylon 610, Nylon 612, etc. which have relatively long methylene groups are preferable because they have low water absorption and good stability in size. In addition, various kinds of copolymerized Nylons can be used. The homo- or copolymerized Nylons used should preferably have more than six methylene groups per one acid amide bond in the main chain of the polyamide, from the viewpoint of durability.

It is preferable that the polyamide adhesive agent used for various coated metallic sheet of this invention is the polyamide having normally the melting point ranging about 140°C to 270°C. The jointing work may be done at a temperature enough to melt the same. For example, when the Nylon 12 is used, the adhesion temperature may be 200°C to 300°C, preferably 220°C to 270°C and the time required therefor may be 1 to 10 seconds.

The following examples show the specific embodiments of the invention using the cold-rolled steel sheet, the very thin nickel-plated steel sheet, the aluminium-plated steel sheet and the aluminium sheet as the respective material sheets for coating.

EXAMPLE 1

70 g of phenol and 30 g of orthocresol were dissolved in 75 g of 37% formalin, to which 10 g of 25% aqueous ammonia solution was added. The resulting mixture was subjected to a heating reaction at 90°C for one hour. Then the resinous layer was dissolved in 100 g of n-butanol, to which 100 g of benzene and 100 g of ethanol were added. It was then washed three times with 200 g of water whereby the organic layer was concentrated under reduced pressure to produce a yellow-brown, viscous orthocresol-denaturated phenol-formaldehyde resin (the thermal-reaction type phenol resin). The resin thus obtained and the EPIKOTE 1007 (mean molecular weight: 2900) made by Shell Oil Co., Ltd. as the bisphenol A type epoxy resin were dissolved in methyl ethyl ketone in the mixing ratio shown in Table 1 to produce a solution having the resin concentration of 20 percent. This solution was coated on a 0.24 mm cold-rolled steel sheet, which was then dried in the ventilation dryer at 60°C, followed by curing at 240°C for 3 minutes. The amount of the resin after curing was 50 mg/100 cm$^2$.

A dried film of Nylon 12 having thickness of 100$\mu$ (PLATILON "L" made by Toagosei Chemical Industry Co., Ltd.) was pinched between the metals and heat-pressed at 280°C for 3 seconds. After allowed to stand at normal temperature for one day, it was tested by a tensile strength testing machine having a thermostatic bath at 120°±1°C and the tensile velocity of 200 mm/minute to obtain the T-peel strength. The result is shown in Table 1, which clarifies the range of the desirable ratio of the thermosetting phenol resin to the bisphenol A type epoxy resin.

Table 1

| Runs | Effect of the epoxy phenol Bisphenol "A" type epoxy resin Thermosetting phenol resin (Weight ratio) | | T-peel strength (Kg/25mm) |
|---|---|---|---|
| 1 | 0.5/9.5 | (=0.05/1) | 8.0 |
| 2 | 2/8 | (=0.25/1) | 26.2 |
| 3 | 4/6 | (=0.67/1) | 28.0 |
| 4 | 6/4 | (=1.5/1) | 24.4 |
| 5 | 8/2 | (=4.0/1) | 9.6 |

EXAMPLE 2

A very thin nickel-plated steel sheet (amount of nickel: 0.005$\mu$) having the thickness of 0.24 mm was used as the material sheet. The resins used were the same as those used in Example 1. The weight ratio of the bisphenol A type epoxy resin to the thermosetting phenol resin was made constant. The Nylon 11 (PLATILON "E" made by Toagosei Chemical Industry Co., Ltd.) was used as the adhesive film having the thickness of 100$\mu$. The test was conducted with varied temperatures for tension as shown in Table 2, other conditions being equal to those of Example 1. The result of the test is shown in Table 2, which shows that the strong peel strength is given over wide range of temperatures, especially above 100°C.

Table 2

| Runs | Temperature for tension (°C) | T-peel strength (Kg/25mm) |
|---|---|---|
| 6 | −20 | 38.6 |
| 7 | 0 | 42.0 |
| 8 | 50 | 52.0 |
| 9 | 100 | 36.0 |
| 10 | 130 | 20.6 |

EXAMPLE 3

A vacuum-evaporated aluminium-plated steel sheet (amount of aluminium plated: 0.1$\mu$) and an anode-treated aluminium sheet were used as the respective material sheets. The test was conducted under the same conditions as in Example 1 except that the kind of the bisphenol A type epoxy resin was changed and the weight ratio of the epoxy resin to the thermosetting phenol resin was made 4/6. The result of the T-peel strength at the temperature of 120°±1°C is shown in Table 3. The result shows that the mean molecular weight of EPIKOTE should preferably be 1400 to 2900.

Table 3

| Runs | Epoxy resins used (mean molecular weight) | T-peel strength (Kg/25mm) |
|---|---|---|
| 1 | EPIKOTE 828 (380) | 6.0 |
| 2 | EPIKOTE 1004 (1400) | 26.2 |
| 3 | EPIKOTE 1007 (2900) | 32.0 |
| 4 | EPIKOTE 1031 | 10.3 |

Table 3-continued

| Runs | Epoxy resins used (mean molecular weight) | T-peel strength (Kg/25mm) |
|---|---|---|
| 5 | EPIKOTE 828 (380) | 6.2 |
| 6 | EPIKOTE 1004 (1400) | 26.8 |
| 7 | EPIKOTE 1007 (2900) | 30.2 |
| 8 | EPIKOTE 1031 (703) | 9.6 |

Note:
The material sheet used is the aluminum-plated steel sheet in Runs 1 to 4 and the anode-treated aluminium sheet in Runs 5 to 8. The EPIKOTE resins used are those made by Shell Oil Co., Ltd.

We claim:

1. A coated metallic sheet adapted for use as a container or can which comprises a composition coated on a material sheet selected from the group consisting of cold-rolled steel sheet, very thin nickel-plated steel sheet, aluminium-plated steel sheet and aluminium sheet, said composition consisting of resol-type thermosetting phenol-formaldehyde resin and bisphenol A type epoxy resin at the ratio of one part by weight of said phenol-formaldehyde resin to 0.2 to 1.5 part by weight of said epoxy resin, said phenol-formaldehyde resin comprising orthocresol and phenol at the weight ratio of 60:40 to 10:90, and said epoxy resin having a mean molecular weight of 800 or more.

* * * * *